US009796527B1

(12) United States Patent
Kaukl et al.

(10) Patent No.: US 9,796,527 B1
(45) Date of Patent: Oct. 24, 2017

(54) HIGH DENSITY AUTOMATED STORAGE AND RETRIEVAL SYSTEM

(71) Applicant: Amazon Technologies, Inc., Seattle, WA (US)

(72) Inventors: Christopher Vincent Kaukl, Sammamish, WA (US); Xiaoshan Cai, Seattle, WA (US); Avinash Shripathy Bhat, Seattle, WA (US); Margaux Eng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/869,756

(22) Filed: Sep. 29, 2015

(51) Int. Cl.

| | |
|---|---|
| ***B65G 1/06*** | (2006.01) |
| ***B65G 1/04*** | (2006.01) |
| ***B65D 25/20*** | (2006.01) |
| ***B65G 1/137*** | (2006.01) |

(52) U.S. Cl.
CPC ........... *B65G 1/0492* (2013.01); *B65D 25/20* (2013.01); *B65G 1/0478* (2013.01); *B65G 1/1373* (2013.01)

(58) Field of Classification Search
CPC .......... B65G 1/06; B65G 1/065; B65G 35/06; B65G 1/0478; B65D 25/50; E04H 6/14
USPC ..... 414/233, 235, 331.01, 331.02, 286, 266, 414/807; 104/172.2, 172.3; 198/717, 198/718, 725, 731, 732, 465.1
See application file for complete search history.

(56) References Cited

U.S. PATENT DOCUMENTS

| | | | | |
|---|---|---|---|---|
| 4,273,053 A * | 6/1981 | Gibbs | B65G 1/0478 | 104/165 |
| 4,732,524 A * | 3/1988 | Suominen | B65G 1/06 | 198/468.6 |
| 5,066,187 A * | 11/1991 | Hammer | E04H 6/22 | 414/237 |
| 5,314,285 A * | 5/1994 | Lai | E04H 6/22 | 414/236 |
| 5,707,199 A * | 1/1998 | Faller | E04H 6/24 | 414/21 |
| 5,857,413 A * | 1/1999 | Ward | B61J 1/10 | 104/130.01 |
| 7,381,022 B1 * | 6/2008 | King | B65G 1/0492 | 187/270 |
| 7,931,431 B2 * | 4/2011 | Benedict | B63B 25/22 | 280/755 |

(Continued)

*Primary Examiner* — Anna Momper
*Assistant Examiner* — Mark Hageman
(74) *Attorney, Agent, or Firm* — Knobbe, Martens, Olson & Bear, LLP

(57) ABSTRACT

A multi-dimensional automated storage and retrieval system is provided herein that enables the space-efficient storage of containers within a three-dimensional lattice structure. Each container includes one or more drivers to engage with rails of the three-dimensional lattice structure, enabling the container to slide along the rails based on a propulsion system. A control device is provided to selectively engage each container to a desired rail of the lattice structure, and to provide power to the propulsion system, thereby moving the container to a desired location within the lattice structure. Due to the high storage efficiency of the disclosed automated storage and retrieval system, the system may be utilized in space-sensitive applications, such as vending machines for physical goods or in cargo vehicles such as trailers.

16 Claims, 13 Drawing Sheets

(56) References Cited

U.S. PATENT DOCUMENTS

| | | | | |
|---|---|---|---|---|
| 7,941,243 | B2 * | 5/2011 | Borgwarth | B65G 1/0478 198/463.3 |
| 9,315,320 | B2 * | 4/2016 | Kawano | B65G 1/0435 |
| 2008/0240900 | A1 * | 10/2008 | Reisenauer | B65G 1/0478 414/798.5 |

* cited by examiner

HIGH DENSITY AUTOMATED STORAGE AND RETRIEVAL SYSTEM

BACKGROUND

Automated storage and retrieval systems are frequently utilized by warehouses or other storage or fulfillment centers to store and retrieve physical items. These automated storage and retrieval systems often include computer-controlled retrieval machines that move along predetermined paths to retrieve storage bins (or other storage units) and deliver the bin to a human operator or other automated system. For example, a carousel-type automated storage and retrieval system generally places all items within a rotational carousel of holding locations. To retrieve an item from a carousel-type automated storage and retrieval system, the system rotates the carousel until the desired item is at a predetermined load and unload point on the carousel. As another example, unit load automated storage and retrieval systems typically utilize discrete retrieval machines that move vertically and horizontally along a shelf of stored goods, and include mechanisms to place or retrieve objects from the shelves.

Often, a significant portion of the space used by an automated storage and retrieval system is unusable for storage. For example, in a unit load system, each retrieval unit generally requires a portion of space between each shelf to allow the retrieval unit to access every item on the shelf. While carousel-units are more space efficient, retrieval of an item from these units requires cycling each stored item, reducing retrieval speed significantly.

DETAILED DESCRIPTION

Generally described, aspects of the present disclosure relate to a multi-dimensional automated storage and retrieval system (ASRS) that provides high utilization of storage space while enabling rapid retrieval of any stored item. Specifically, a multi-dimensional ASRS is disclosed that utilizes a three-dimensional lattice of rails, spaced at regular intervals, each of which includes a drive chain or other propulsion system usable by containers stored within the ASRS. Containers within the ASRS are sized to fit between rails of the lattice, and include drivers that can selectively engage with the propulsion system within each rail. A control system monitors the location of each container, and enables containers to be moved to any location (such as a load/unload location) within the ASRS. Specifically, the control system communicates with each container within the ASRS, and individually instructs the containers to engage or disengage a rail in a direction of travel (e.g., along an X, Y or Z axis). The control system thereafter engages the propulsion system of the rails to move one or more containers within the lattice. Because each container within the ASRS is individually movable, each container can be moved to any location within the ASRS so long as the space of a single container within the ASRS is left empty. The movement of containers within the ASRS can be achieved by viewing the configuration of the ASRS as a three-dimensional version of a two-dimensional "sliding block puzzle," where each container represents a block within the puzzle. Because only a single container-sized space need remain empty, the disclosed ASRS is able to utilize nearly all of the space available to the ASRS for storage purposes. Further, the control system can be programmed to select the most efficient path to move containers within the ASRS, such that load and unload operations require movement of only a small number of the total containers within the ASRS. Due to the high storage efficiency of the disclosed ASRS, the ASRS may be utilized in space-sensitive applications, such as vending machines for physical goods or in cargo vehicles such as trailers.

The foregoing aspects and many of the attendant advantages of the present disclosure will become more readily appreciated as the same become better understood by reference to the following, when taken in conjunction with the accompanying drawings.

Figure 1:
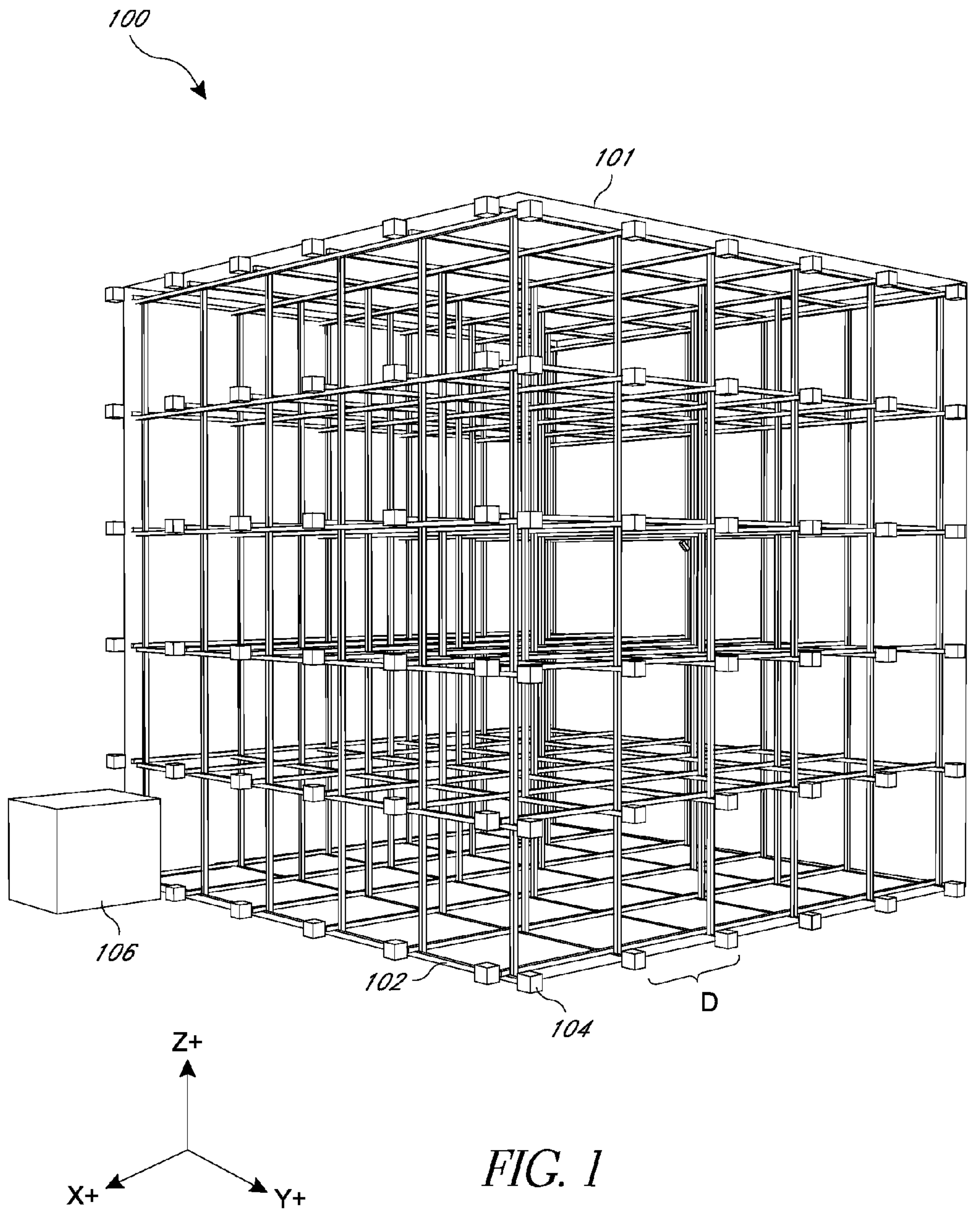
FIG. 1 is an illustrative depiction of a multidimensional automated storage and retrieval system (ASRS) in accordance with embodiments of the present disclosure.

FIG. 1 is a projection of a multidimensional ASRS 100 according to embodiments of the present disclosure. As shown in FIG. 1, the ASRS 100 includes a series of rails 102 or other support members in each of three dimensions, labeled as X, Y, and Z, respectively, forming a lattice structure. The spaces between the rails 102 define cavities through which containers (not shown in FIG. 1) may move within the ASRS 100. In the illustrative embodiment of FIG. 1, the rails 102 are spaced at an even distance D, such that the cavities between the rails 102 are cubical. In other embodiments, the distance between the rails in any given dimension (e.g., $D_x$, $D_y$, $D_z$) may vary, such that the cavities between the rails 102 form any rectangular prism. As will be described below, containers may be shaped to fit within the cavities between rails 102, such that they may be moved throughout the ASRS 100 in any of the three dimensions.

To enable movement of containers throughout the lattice structure of the ASRS 100, each rail 102 includes a propulsion device (not shown in FIG. 1), such as a chain or belt device, attached to a driving mechanism 104. As described in more detail below, each container within the ASRS 100 may selectively attach to the propulsion device of a rail 102 in either the X, Y or Z dimension, after which the driving mechanism 104 may be used to move the container in either a forward or reverse direction along the rail 102. In one embodiment, the driving mechanism 104 for each rail 102 is an individual motor capable of moving the containers in increments of w (the width of one rail 102) and D (the distance between rails 102, including the width of one rail 102). In another embodiment, the driving mechanism 104 is a transmission or other detachable coupling connected to a motor shared between multiple rails 102, such that the shared motor may provide propulsion to multiple rails 102. For example, a transmission for each rail 102 may be attached to a shared motor such that the transmission can be in either a neutral, forward, or reverse gear. In this way, multiple containers within the ASRS 100 may be moved simultaneously. In some embodiments, only a single rail 102 is required to provide propulsion at any time, and thus, shared motors between rails 102 may reduce the cost and complexity of the ASRS 100. Moreover, because many embodiments require each rail to move containers at fixed multiples of D, multiple rails 102 may be connected to a single motor without requiring intermediate gearing to vary the speed of propulsion provided among rails 102.

The driving mechanism 104 for each rail 102 may be controlled by a control system 106, which includes a computing device configured with specific computer-executable instructions to move containers within the ASRS 100. Illustratively, the control system 106 may include one or more processors and memories collectively configured to enable movement and tracking of containers within the lattice 101, as described herein. The control system 106 may further include a data store, which may correspond to any persistent or substantially persistent storage device (e.g., a hard disk drive, solid state disk drive, flash memory, etc.) utilized to store information regarding the state of the lattice 101, including positions of containers included within the lattice 101 and/or items stored within containers included within the lattice 101. Furthermore, the control system 106 can include input/output interfaces enabling communication between the control system 106 and components of the ASRS 100, including but not limited to containers within the lattice 101 and driving mechanisms 104 associated with rails 102 of the lattice 101.

In an illustrative embodiment, the control system 106 is in communication with each container via either a wireless or wired communication channel, as described in more detail below. The control system 106 may instruct individual containers to attach to an adjacent rail 102 within the ASRS, thereby causing the containers to move along the rail 102 when the motor 104 connected to the rail 102 is engaged. Thereafter, the control system 106 can cause the motor to engage with and provide propulsion along the rail 102. In one embodiment, each motor 104 (either individual to a rail 102 or shared between rails 102) is a servomotor providing a closed-loop servomechanism, such that the control system 106 can accurately control the position of the propulsion device within the rail 102 (and, therefore, the position of each container 102). Thus, by instructing a container to attach to a rail 102, and causing a motor to provide power to the propulsion system of that rail 102, the control system 106 can move the container along the rail 102. Because multiple containers may be aligned to a single rail, the control system 106 may cause multiple containers to move along the rail simultaneously, under power of the rail 102's propulsion device. In some embodiments, the control system 106 can provide power to a number of different rails 102 within the ASRS 100, and therefore may move any number of containers within the ASRS 100 simultaneously.

To assist in storage and retrieval of containers within the ASRS 100, the control system 106 may be configured to track the location of each container within the ASRS 100. As such, each container can be associated with an identifier, such as a serial number, and a position within the ASRS 100. In one embodiment, positions within the ASRS 100 are identified as a triple value, corresponding to the X, Y, and Z location of the container within the ASRS 100 lattice. For example, a container between the first and second rails 102 in a given axis of the ASRS 100 may be in position zero with respect to that axis. Thus, a container in position "000" would be located between the first and second rails 102 of each of the X, Y and Z axes. A container in the position "001" would be located between the first and second rails 102 of the X and Y axes, and between the second and third rails 102 of the Z axis. When a container is moved from one position within the ASRS 100 lattice to the next, the control system 106 can update the container's position within a database or other data store (either included within or external to the control system 106), and thus maintain an accurate position for each container within the ASRS 100. One of skill in the art will recognize that the other systems are possible to track the position of the container within the ASRS 100 lattice.

The ASRS 100 lattice may include a load/unload position (e.g., position "000" within the lattice) to enable containers to be placed into and removed from the ASRS 100. When a container is placed within the load/unload position, the control system 106 can obtain an identifier of the container (e.g., via communication with the container, as will be described below), and cause the container to be moved to alternative positions within the ASRS 100 lattice. The control system 106 can the store the final position of the container within a database of container positions, so that the container may later be retrieved. To retrieve a container from the ASRS 100, an operator (either human or automated) can request that a container (e.g., specified by container identifier) be moved to the load/unload position. The control system 106 can then cause the container to be moved to the load/unload position for removal.

Because many containers may be included within the ASRS 100 lattice, moving a single container throughout the lattice may require shifting of many other containers also within the lattice. In this regard, movement of containers through the ASRS 100 lattice can be viewed as a three-dimensional version of the common two-dimensional "sliding block puzzle." As in common sliding block puzzles, only a single position within the ASRS 100 lattice need be unoccupied to enable a container to be moved to any position within the ASRS 100 lattice. However, multiple unoccupied positions may enable containers to be moved throughout the lattice 101 more rapidly. In one embodiment, the control system 106 can maintain a virtual representation of the lattice 101 within a memory of that system 106, and can execute an algorithm for solving a sliding block puzzle corresponding to the lattice 101 in order to move a specified container in the lattice to a specified position. Thereafter, the control system 106 can execute the shifting of containers necessary to move the specified container within the lattice 101 to the specified position, which may be the load/unload position.

One illustrative algorithm for shifting containers within the lattice 101 will be generally described with reference to a lattice 101 that includes at least one empty cavity (e.g., a location between rails in each of the X, Y and Z dimensions not occupied by a container). For the purposes of description, it will be assumed that this cavity may be "shifted" within the lattice 101. However, one of skill in the art will appreciate that "shifting" of a cavity is an expression of convenience that refers to the shifting of containers within the lattice 101 to create a cavity in a desired location. Within the lattice 101, a cavity may be generally shifted to any position by no more than three operations (where an operation includes moving one or more containers simultaneously along a specific rail 102 by engaging the one or more containers to the rail 102 and powering the rail 102's propulsion device). In order to move a container within a desired direction (e.g., positively or negatively within a given dimension), the cavity may be moved in the lattice 101 to be located adjacent to the container in that desired direction. Thereafter, the container may be shifted into the position of the cavity. This operation (e.g., movement of a cavity and shifting of a container into that cavity) can then be repeated to move a container any number of positions within a desired direction. Thus, the control system 106 may move a container from any current position within the lattice 101 to any desired position, by first determining a triple vector representing the difference between the current position and the desired position as a function of three dimensions (e.g., "$N_x$, $N_y$, $N_z$" where each value specifies a movement in one of the X, Y or Z dimensions in order to arrive at the desired portion), and then moving the container according to the vector (e.g., first moving the container $N_x$ positions in the X dimension, then $N_y$ positions in the Y dimension, and then $N_z$ positions in the Z dimension). While one algorithm for moving containers within the lattice 101 is described herein, the control system 106 may additionally or alternatively implement other algorithms, such as those developed to solve sliding block puzzles. Algorithms for solving a sliding block puzzle are known in the art, and therefore will not be described in detail herein.

In one embodiment, the control system 106 may further be configured to maintain an inventory of items stored within containers. For example, when a container is placed within the ASRS 100, an operator (either human or automated) may report the contents of the container to the control system 106. Thereafter, an operator may request an item from the ASRS 100, and the control system 106 may cause the container storing the requested item to be moved to a load/unload position of the lattice 101.

Figure 2A:
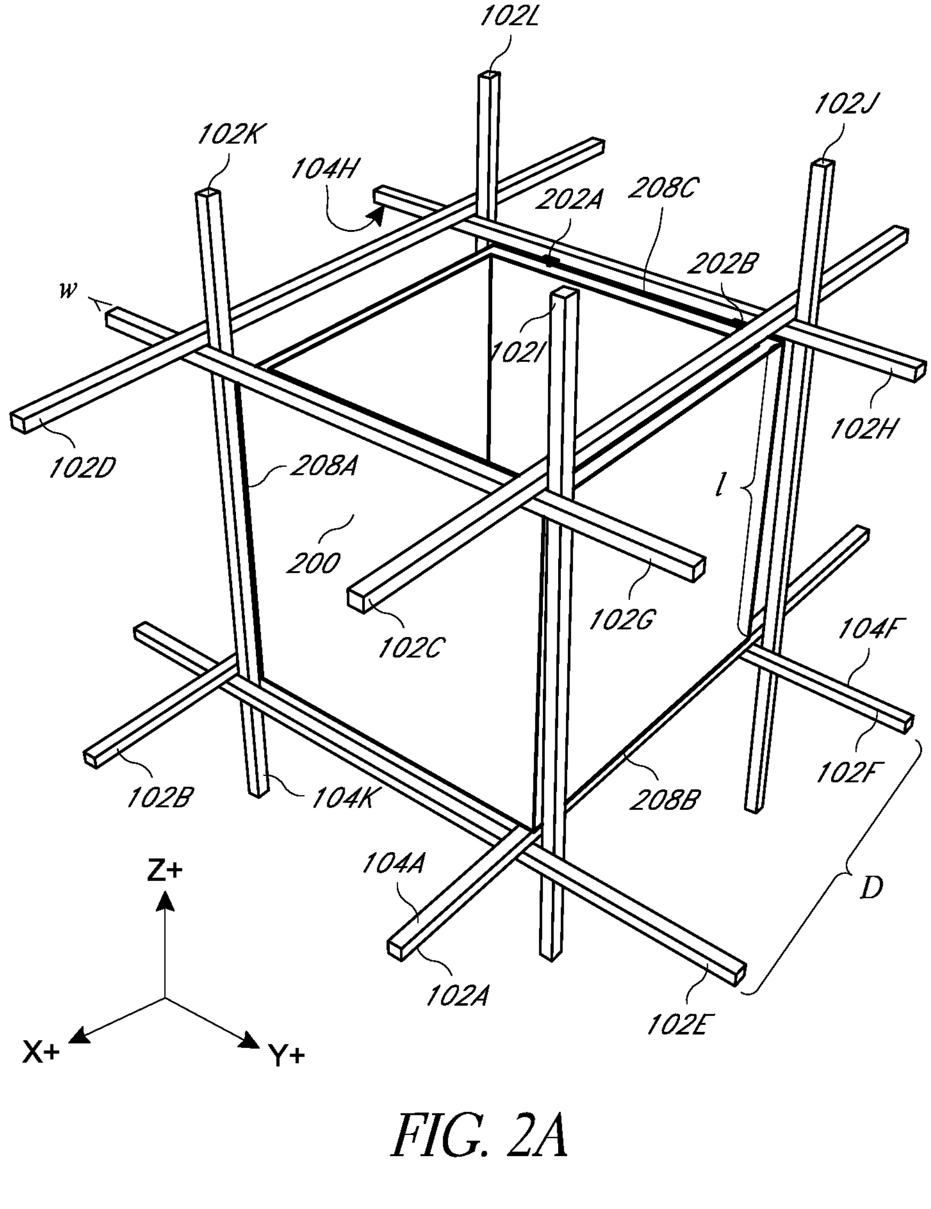
FIG. 2A is a schematic, top-front isometric view of a portion of the ASRS, including a container enabled to move through the ASRS without requiring a distinct retrieval unit.
Figure 2B:
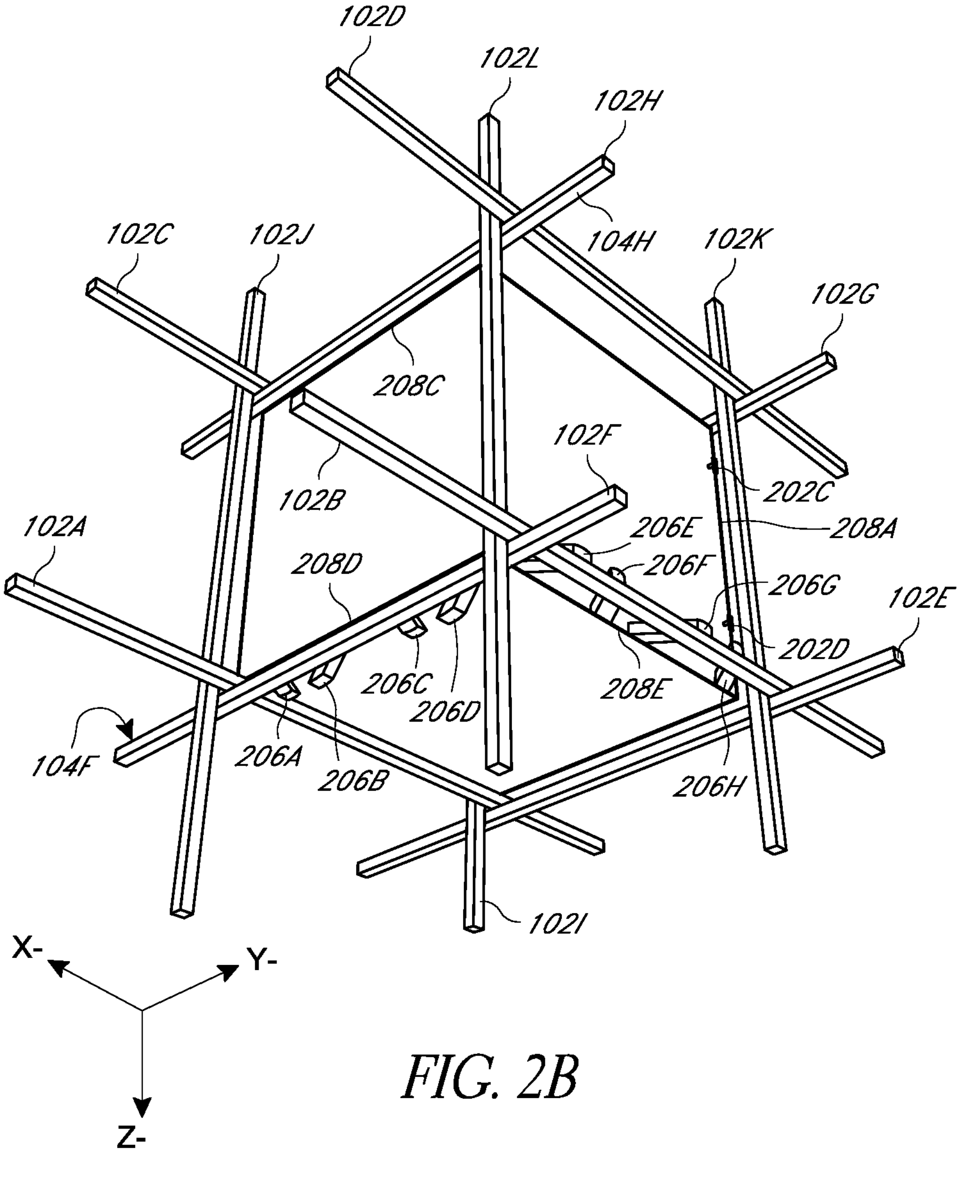
FIG. 2B is a schematic, bottom-rear isometric view of the portion of the ASRS of FIG. 2A.

FIGS. 2A and 2B are schematic depictions of one portion of the ASRS lattice 101, forming a single cavity occupied by a container 200. Specifically, FIG. 2A shows a top-front view of the lattice 101 and container 200, while FIG. 2B shows a bottom-rear view of the lattice 101 and container 200. For ease of reference, both FIGS. 2A and 2B will be discussed simultaneously.

As shown in FIGS. 2A and 2B, the cavity is formed by twelve rails 102, four parallel rails enabling movement in the X dimension (labeled in FIG. 2 as 102A-D), four parallel rails enabling movement in the Y dimension (labeled in FIG. 2 as 102E-H), and four parallel rails enabling movement in the Z dimension (labeled in FIG. 2 as 102I-L). As shown in FIG. 2A, the rails 102 of any given dimension do not directly intersect with the rails 102 of the other dimensions, but are slightly skewed so that a container 200 may slide along the rail 102 unimpeded. Thus, the container 200 may slide in X dimension along rail 102A, in the Y dimension along rail 102H, and in the Z dimension along rail 102K. The specific rails 102 along which the container 200 moves may be altered by rotating or inverting the configuration of the rails 102, and may therefore vary among embodiments of this disclosure.

The container 200 can be sized to enable the container 200 to move between the rails 102 without contact. As shown in FIGS. 2A and 2B, the spaces between two adjacent, parallel rails 102 (sharing a common X, Y or Z-dimensional plane) in the lattice 101 are of a width equal to the spacing of the rails 102 ("D"), minus the width of one rail 102 ("w"). Accordingly, the illustrative container 200 of FIGS. 2A and 2B forms a cube, with edges of length l, where l is no larger than D minus 2w (where one value of w represents the width of the rails 102 the container moves past, and the second value of w represents the width of the rail 102 the container moves along). When the edges of the container 200 are set at exactly length l, the container will fit through the lattice 101 with no more than w distance between the container 200 and any rail 102.

To enable movement along the rails 102, each rail 102 includes at least one face to which the container 200 can be attached. Specifically, in FIG. 2A, the container 200 may attach to the rail 102A via the rail face 104A, to the rail 102H via the rail face 104H, and to the rail 102K via the rail face 104K. To attach to each rail 102, the container 200 includes at least one driver 202 for each dimension X, Y, and Z. As discussed in more detail below, each driver corresponds to a computer-controlled member that may be selectively attached to the rails 102 to enable connection with and movement along the rail 102. In some embodiments, the faces of the rail 102 to which the container 200 engages may also be modified from the embodiment described in FIG. 2A. In general, the container 200 may engage with any face of a rail 102 in a given dimension that is directed away from corresponding rails 102 in the other two dimensions of the lattice 101. For example, to enable movement in the X dimension, the container 200 may engage with either face 104A (as shown in FIG. 2A), or the face of rail 102A that extends in the negative Y direction. Similarly, to enable movement in the Y dimension, the container 200 may engage with either face 104H (as shown in FIG. 2A), or the face of rail 102H that extends in the positive X direction. Modification of the rail faces to which a container 200 engages may also require corresponding modification in the stabilizers 206, which are discussed in more detail below.

In the illustrative embodiment, two drivers 202 for each dimension are included within the container 200, though fewer or more drivers 202 for each dimension may be provided within each container 200. In FIG. 2A, the drivers 202 enabling movement in the Y dimension are shown as drivers 202A and 202B, while the drivers 202 enabling movement in the Z dimension are shown as drivers 202C and 202D. The container 200 is shown in FIGS. 2A and 2B as connected to rail 102A, and therefore the drivers 202 enabling movement in the X direction are hidden from view in FIGS. 2A and 2B by rail 102A. While the drivers 202 of FIG. 2A are shown in the extended position, each driver 202 may be retracted flush with the surface of the container 200 to enable unfettered movement when not in use. As such, the drivers 202A and 202B may be extended only when the container 200 is moved in the Y dimension, drivers 202C and 202D may be extended only when the container 200 is moved in the Z dimension, etc. Extension and retraction of the drivers can be controlled by the control system 106.

The control system 106 can further utilize the drivers 202 to switch attachment of the container 200 between rails 102 of different dimensions. Specifically, each driver 202 may be extendable from the container 202 at least a distance necessary to attach to any adjacent rail 102. As noted above, where the container 100 forms a cube with edges of length l (equal to D minus 2w), the container 100 will be no further than the distance w from any adjacent rail 102, when moved to align with that rail 102. In such embodiments, each driver 202 may be extendable from the container 200 by at least a predetermined distance greater than the distance w in order to engage with another rail 102. In order to attach to an adjacent rail, the control system 106 can align the container 200 with a desired rail 102, extend the driver 202 the length necessary to contact the rail 102, and engage the driver 202 with the rail 102. The specific process by which a driver 102 may be attached to a rail is discussed below in more detail with respect to FIGS. 4A-5C.

As one illustrative example, assume that the control system 106 determines that the container 200 should be detached from rail 102A (enabling movement in the X dimension) and attached to rail 102K (enabling movement in the Z dimension). As shown in FIGS. 2A and 2B, the container 200 is currently aligned with rail 102K (e.g., the edge 208A of the container 200 is across from face 104K of the rail 102K, such that moving the container 200 in the X direction will cause the edge 208A to overlap face 104K). Accordingly, the control system 106 may instruct the container 200 to extend the drivers 202C and 202D (shown in FIG. 2B) to engage with the face 104K. The control system 106 can then instruct the container 200 to detach the drivers 202 engaged with rail 102A (which are obscured in FIG. 2A by the rail 102A), and instruct the container 200 to contract drivers 202C and 202D, causing the container 200 to engage and/or make contact with face 104K. The control system 106 can then cause the container 200 to travel in the Z dimension along rail 102K by engaging the propulsion device of the rail 102K. Conversely, the container 200 may be detached from rail 102K by extending the drivers 202C and 202D, causing the container to push away from the rail 102K, and further causing drivers 202E and 202F to become aligned with face 104A of rail 102A.

As an additional example, assume that the control system 106 determines that the container 200 should be detached from rail 102A and attached to rail 102H, enabling movement in the Y dimension. As shown in FIGS. 2A and 2B, the edge 208C of the container 200 is not yet aligned with rail 102H, because the drivers 202A and B cannot extend to contact the rail 102H. Accordingly, the control system 106 can cause the container 200 to align with rail 102H by moving the container 200 a distance of w (the width of the rails 102) along the rail 102A in the direction of rail 102H. Thereafter, the control system 106 can extend the drivers 202A and 202B from the container 202 to contact the rail 102H. The control system 106 can then instruct the container 200 to detach the drivers 202 engaged with rail 102A, at which point the container 200 is ready to begin movement in the Y dimension along rail 102H.

While two illustrative examples of transitions between rails 102 are provided herein, one of skill in the art will appreciate that the container 200 may generally be transitioned between rails by utilizing the propulsion device of a currently engaged rail 102 to align the container 200 to the desired rail 102, and utilizing drivers 202 of the container to engage the desired rail 102 (and move the container into contact with the rail 102, if necessary). In instances where direct transition between an engaged rail 102 and a desired rail 102 is not possible, the control system 106 may transition the container 200 to an intermediary rail 102. For example, in FIGS. 2A and 2B, transitioning the container 200 from rail 102K to rail 102H may require transitioning the container 200 from rail 102K to rail 102A, and then from rail 102A to rail 102H, as is described in more detail with respect to FIG. 6, below.

To stabilize the container 200 during movement throughout the lattice 101, the container 200 may include stabilizers 206. Stabilizers 206 are shown in FIG. 2B as extended for illustrative purposes. However, each stabilizer 206 may initially be retracted into the container 200, and selectively extended by the container 200 to stabilize motion of the container 200 in a predetermined direction associated with the stabilizer 206. The stabilizers 206 may further be compressible (e.g., via spring-loading) into the container 200 when traveling in that predetermined direction. For example, stabilizers 206A and 206C stabilize movement of the container 200 when moving in the positive direction of the Y axis, and may be angled to compress when contacting X-dimension rails 102, so long as the container 200 is moving in the positive direction. Similarly, stabilizers 206B and 206D may stabilize motion of the container 200 when moving in the negative direction of the Y axis, and may be angled to compress into the container 200 when contacting X-dimensional rails 102 and moving in the negative direction. Individual stabilizers 206 may include friction reducing elements, such as wheels, ball bearings, or friction reducing coatings, along surfaces expected to meet rails 102. In some embodiments, the rails 102 themselves may additionally or alternatively include friction reducing elements along surfaces expected to contact stabilizers 206.

Stabilizers 206 may be either flush with an edge of the container 200, or offset from the edge by a distance of w (the width of a rail), according to which rail 102 the stabilizer 206 rests on. For example, stabilizers 206A-D are shown in FIG. 2B as offset from edge 208D of the container 200 by a distance w such that the container 200 rests on contact face 104F of rail 102F while the container 200 is engaged with rail 102H. In contrast, stabilizers 206E-H are shown in FIG. 2B as flush with the edge 208E of the container 200, such that stabilizers 206E-H contact the rail 102B while the container 200 is engaged with rail 102A. Though only two sets of stabilizers 206 are shown in FIGS. 2A and 2B (corresponding to stabilizers 206A through 206D and 206E through 206H, respectively), the container 200 may include additional stabilizers 206 (not shown in FIGS. 2A and 2B), as discussed below. In some embodiments, multiple stabilizers 206 may be included along any edge of the container 200 to ensure that, when deployed, at least one stabilizer along that edge of the container 200 is always in contact with a rail 102 of the lattice 101. Moreover, some embodiments of the present application may utilize stabilizers to conduct electrical power between the lattice 101 and the container 200. For example, in one embodiment, rails 102 of the lattice 101 may carry alternating current, which can be transferred to the container 200 via a driver 202 engaged with a first rail 102 and a stabilizer 206 contacting a second rail 102. In another embodiment, rails 102 of the lattice 101 may alternate between carrying positive electrical current and providing an electrical ground, both of which can be transferred to the container 200 via a driver 202 engaged with a first rail 102 and a stabilizer 206 contacting a second rail 102. Additional configurations providing electrical power to the container 200 are described below.

Figure 3A:
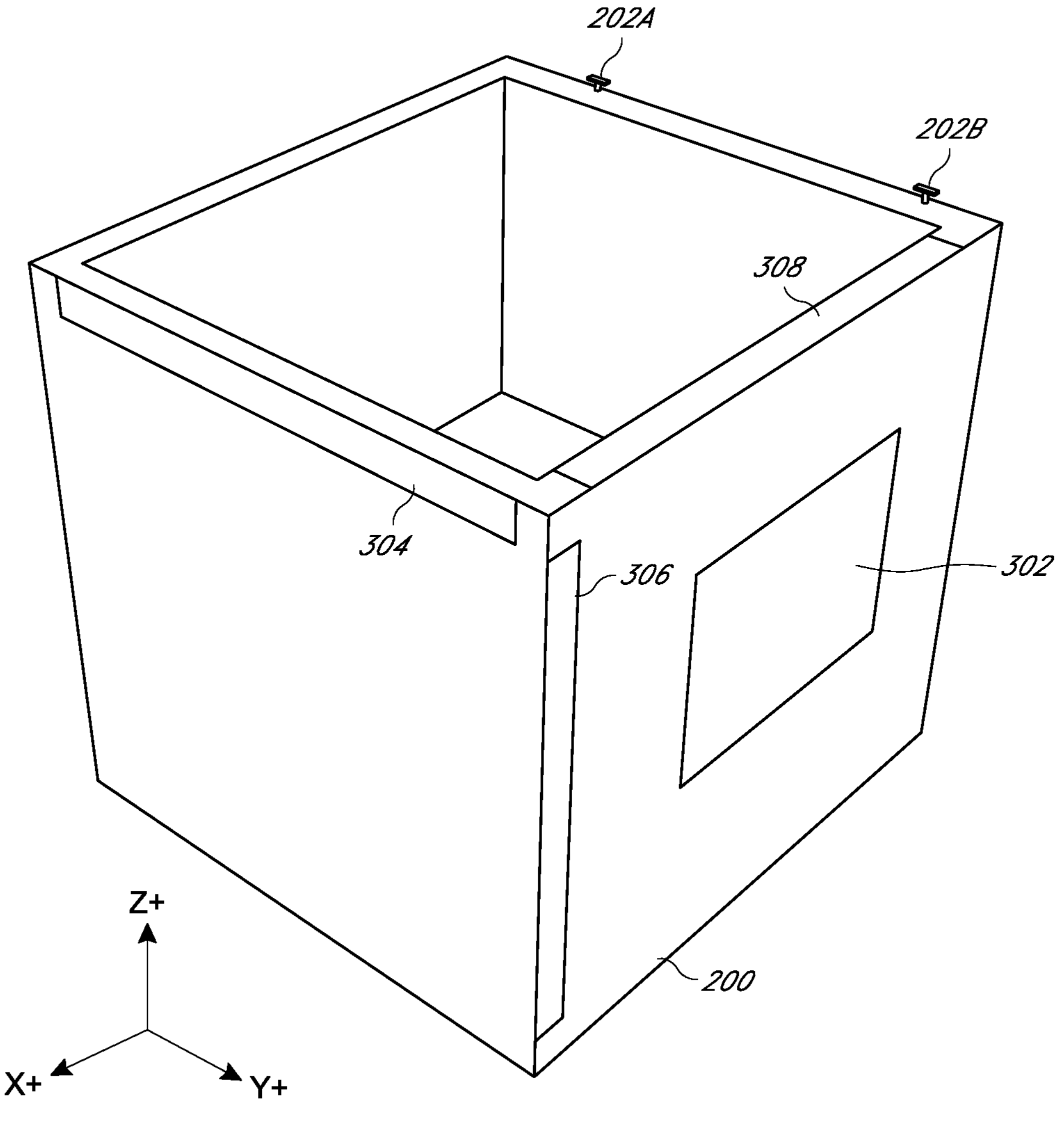
FIG. 3A is a schematic, top-front isometric view of the container, including drivers that enable movement through the ASRS.
Figure 3B:
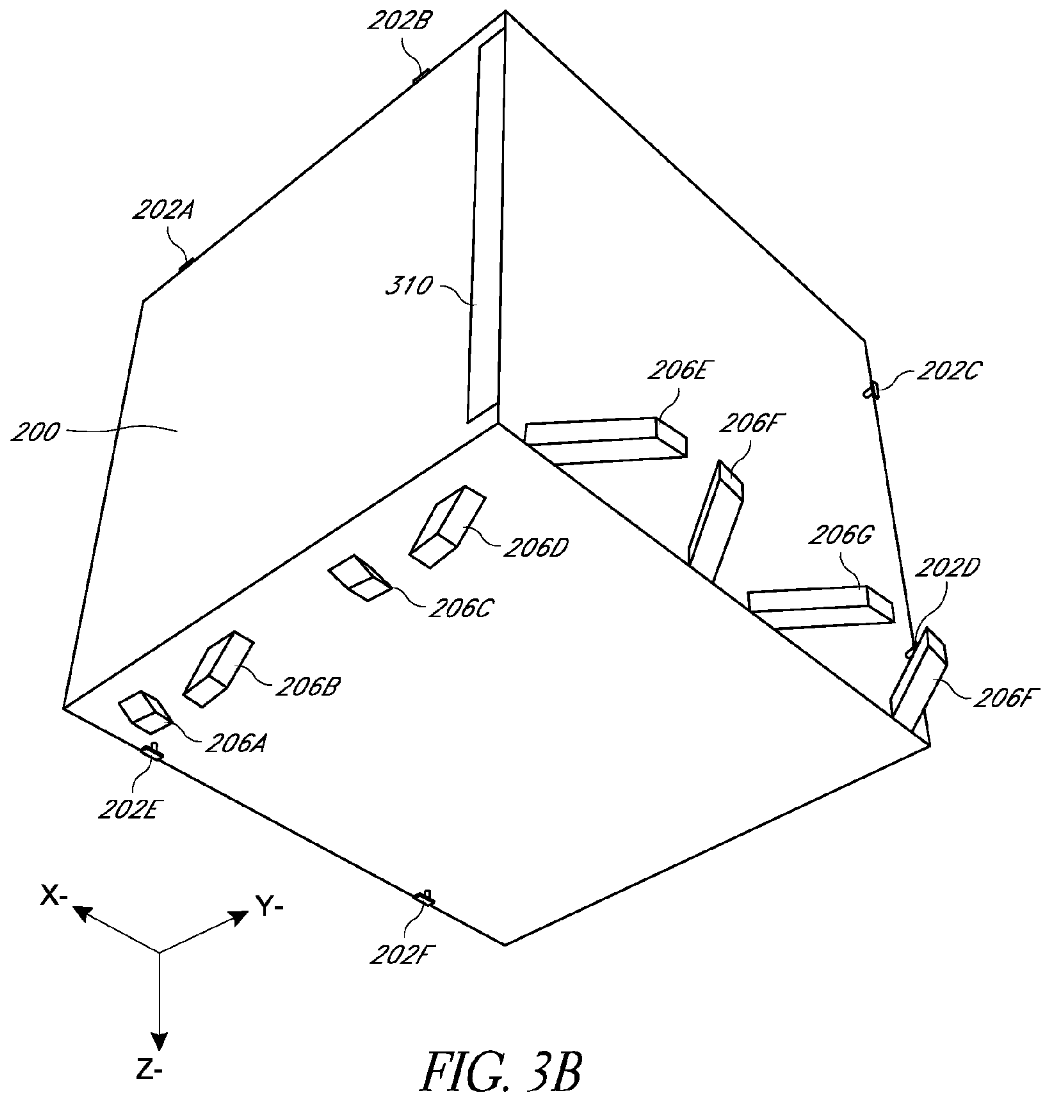
FIG. 3B is a schematic, bottom-rear isometric view of the container of FIG. 3A, including supports used to stabilize the container while moving through the ASRS.

FIGS. 3A and 3B depict the container 200 of FIGS. 2A and 2B independently from the lattice 101. Specifically, FIG. 3A shows a top-front view of container 200, while FIG. 3B shows a bottom-rear view of the container 200. For ease of reference, both FIGS. 3A and 3B will be discussed simultaneously. The container 200 illustratively depicted includes six drivers 202: drivers 202A and 202B enabling motion in the Y direction, drivers 202C and 202D enabling motion in the Z direction, and drivers 202E and 202F enabling motion in the X direction. Each driver 202 is retractable into the container 200 when not utilized for motion. The container 200 further includes stabilizers 206A-H to stabilize motion of the container 200. Specifically, the stabilizers 206A-D stabilize the container 200 when utilizing the drivers 202A and 202B, and the stabilizers 206E-H stabilize the container 200 when utilizing the drivers 202E and 202F. In some embodiments, additional stabilizers 206 (not shown in FIGS. 3A and B) may be included within the container 200. For example, stabilizers 206 may be included at portions 306 and 310 of the container 200 to assist in stabilization of the container 200 when moving in the Z dimension. As a further example, stabilizers 206 may be included at portions 304 and 308 of the container 200 to assist in stabilization of the container when moving in the Y and X dimensions, respectively.

The container 200 can also include a housing 302 including a computing device configured to control functionality of the container 200 based on instructions received from the control system 106. In one embodiment, the computing device may be an embedded microcontroller containing a processor core, memory, and input/output interfaces collectively configured to execute the operations described herein. In another embodiment, the computing device may include one or more distinct processors, memories, and input/output interfaces. Illustratively, the computing device may be programmed with computer-executable instructions to control operation of the drivers 202 (e.g., to retract from or contract into the container 200, and to engage or disengage with the rails 102), as well as operation of the stabilizers 206 (e.g., to retract from or contract into the container 200).

In one embodiment, the computing device may be powered by a battery included within the housing 302. In such embodiments, the computing device may be configured to communicate with the control device 106 to report its battery level, and the control device 106 may report the battery levels of each container 200 to an operator, to ensure that containers are removed and the batteries are replaced prior to the container 200 losing power. In another embodiment, the computing device may be powered via the lattice 101 itself, as described in more detail below.

The computing device of the container 200 may communicate with the control system 106 via either a wired connection, a wireless connection, or a combination thereof. For example, the housing 302 may include a wireless communication unit enabling the computing device to communicate with the control system 106 via a wireless communication protocol, such as the 802.11x or BLUETOOTH™ family of protocols. In embodiments where power to the container 200 is transmitted through the lattice 101, the housing 302 may contain a power-line communication unit enabling communication over the same power-conducting portions of the lattice 101 (e.g., via use of "power-line communication" technologies, which are known in the art).

Figure 4A:
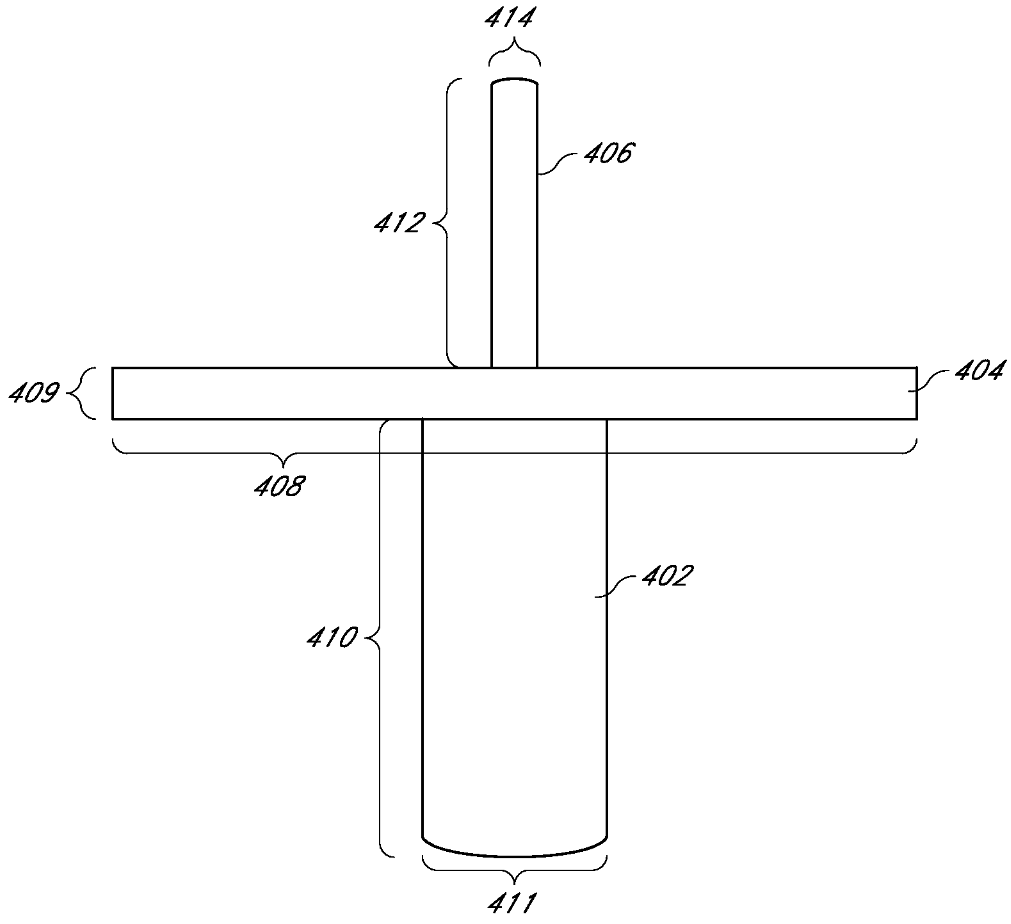
FIGS. 4A-4D are schematic side views of a driver, while in both engaged and unengaged positions.
Figure 4B:
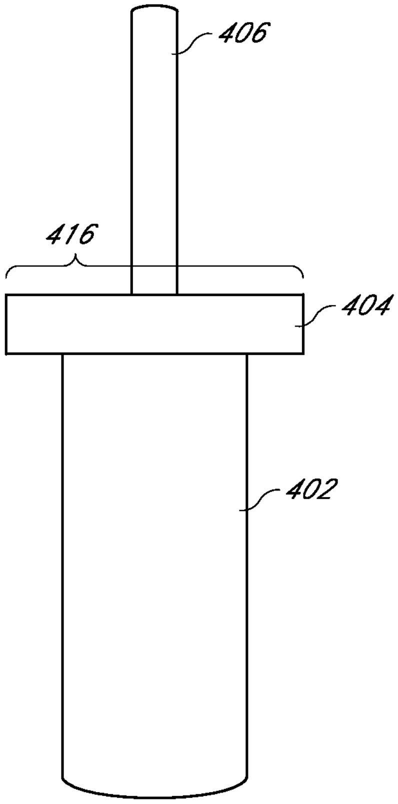
Figure 4C:
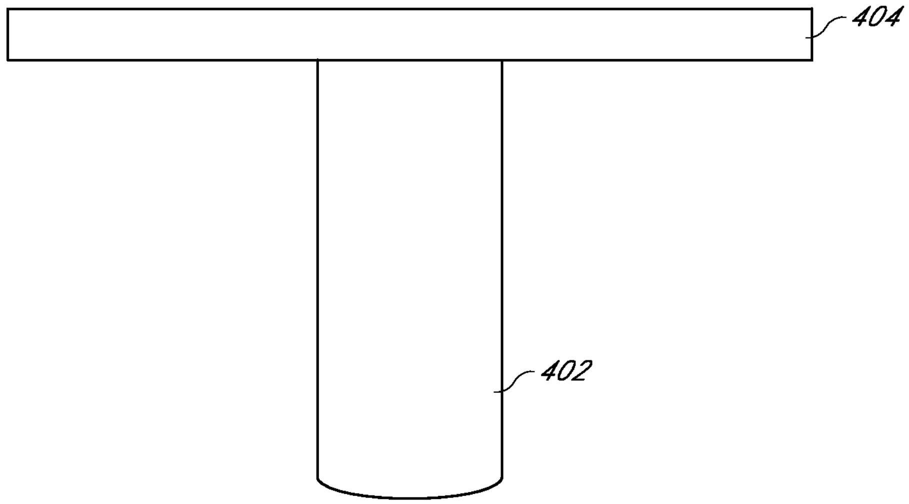
Figure 4D:
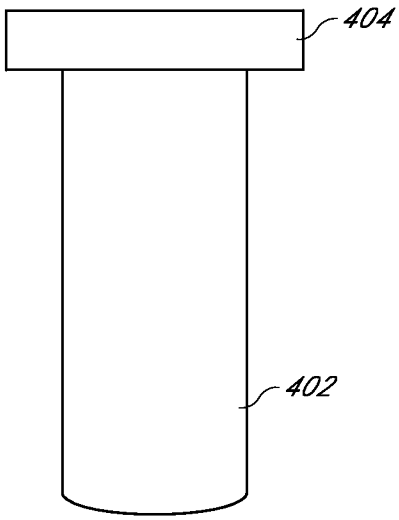

FIGS. 4A-D depict a driver 202 that may be used to engage a container 200 with the lattice 101. Specifically, FIG. 4A is a first side-view of a driver 202 in an engaged state; FIG. 4B is a second side-view of the driver 202 in an engaged state, as rotated 90 degrees along the vertical axis from the depiction of FIG. 4A; FIG. 4C is a first side-view of the driver 202 in a disengaged state; and FIG. 4D is a second side-view of the driver 202 in a disengaged state, as rotated 90 degrees along the vertical axis from the depiction of FIG. 4C.

As shown in FIGS. 4A-D, the driver 202 includes an extension arm 402, an engagement plate 404, and an engagement pin 406. In the embodiment shown in FIGS. 4A-D, the extension arm 402 is cylindrical, and disposed between the engagement plate 404 and a surface of the container 200. The extension arm 402 may be attached to the container 200 via a linear actuator or other mechanism enabling the arm 402 to retract into the container 200, moving the engagement plate 404 flush with or below the surface of the container 200 (so as not to inhibit movement of the container 200 when not utilizing the driver 202). Similarly, a linear actuator or other mechanism may enable the extension arm 402 to extend away from the container 200 in order to meet a rail 102 aligned with the extension arm 202. Accordingly, the length 410 of the extension arm 402 can be selected to be at least as long as the widest possible gap between a surface of the container 200 and an aligned rail 102. In one embodiment, the length 410 of the extension arm 402 exceeds the width w of each rail 102 within the lattice 101. Further, the extension arm 202 can rotate around its axis, to cause the engagement plate to engage with a rail 102, as described in more detail below. Accordingly, the diameter 411 of the engagement arm 402 can be sized to fit within an engagement slot of a rail 102 (not shown in FIGS. 4A-D). For example, the diameter 411 of the engagement arm 402 can be selected so as not to exceed the width of an engagement slot of a rail 102.

The engagement plate 404 can be utilized to engage the driver 202 with a rail 102 by passing through an engagement slot in the rail 102 and rotating to prevent the driver 202 from disengaging from the rail 102. Accordingly, the engagement plate 404 can be sized such that its width 408 does not exceed the interior width of the rail 102 (as shown in more detail with respect to FIGS. 5A-C, below). The depth 416 of the engagement plate 404 (shown in FIG. 4B) can be selected such that the engagement plate 404 can fit into an engagement slot of a rail 102 when correctly aligned with the rail 102. In one embodiment, the engagement plate 404 has a depth 416 that does not exceed the width of an engagement slot in the rail 102.

The engagement pin 406 enables the driver 202 to engage with a propulsion device of a rail 202, such as a drive chain. The engagement pin 406 may be retracted into the driver 202 when not engaged with a rail 102, as shown in FIGS. 4C and D, and extended from the driver 202 when the driver 202 is engaged with a rail 102, as shown in FIGS. A and B. In one embodiment, the engagement pin 406 is attached to a linear actuator within the driver 202 (or container 200) that enables the engagement pin 406 to extend from or retract into the driver 202. In the illustrative embodiments depicted, the engagement pin 406 is cylindrical, with a height 412 selected to enable the engagement pin 406 to engage with a propulsion device of a rail 102 without contacting any other elements within the rail 102 (e.g., support structures). The diameter 414 of the engagement pin 406 can be selected to enable the pin 406 to engage with slots or holes in the propulsion device of the rail 102. For example, where the propulsion device is a roller chain, the engagement pin 406 can be of a diameter smaller than the gaps in the roller chain. Thus, by extending the engagement pin 406, the driver 202 can engage with the propulsion device to move the container 200 along the rail 102.

Figure 5A:
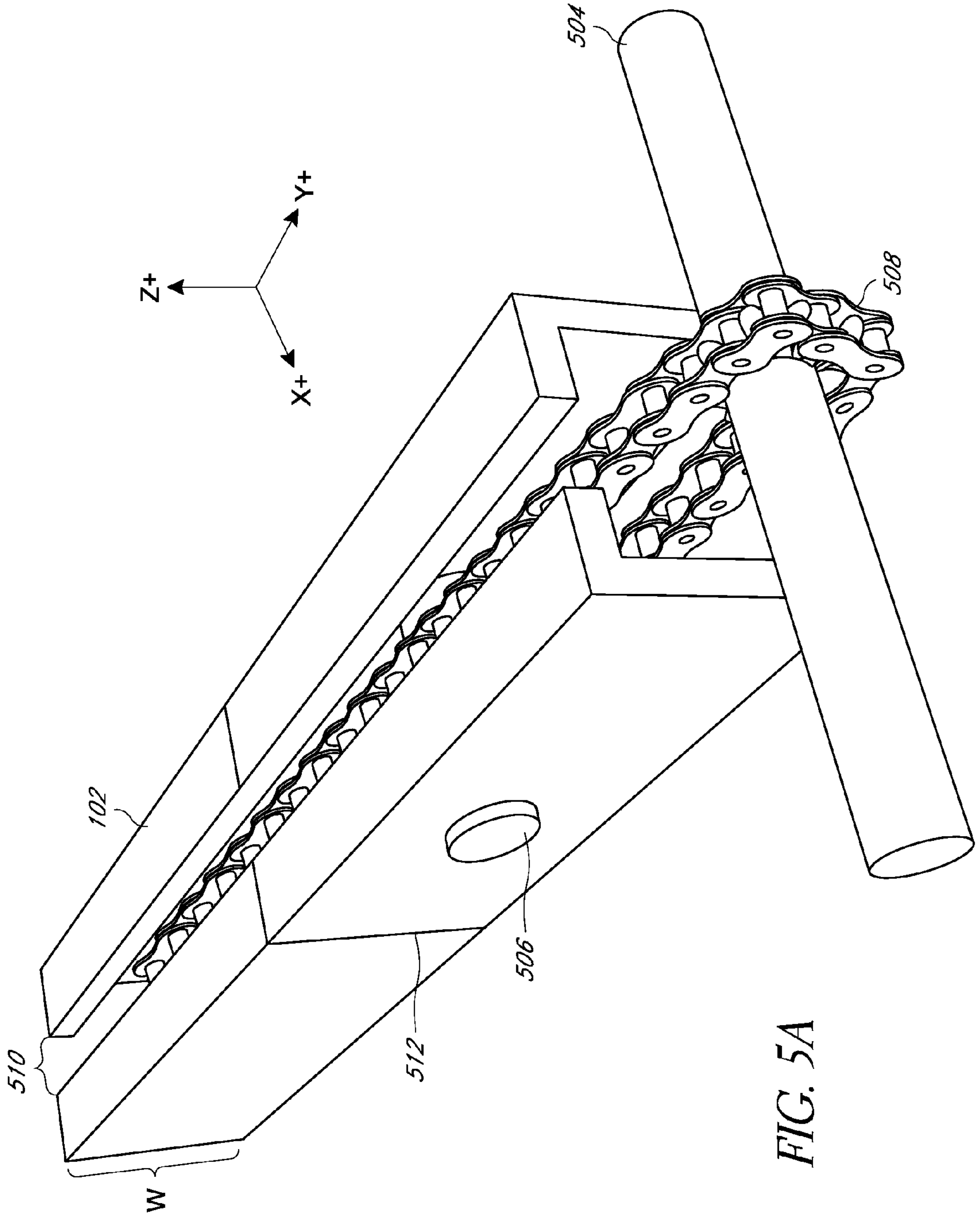
FIG. 5A is a schematic, isometric view of a rail that may form part of the ASRS.
Figure 5B:
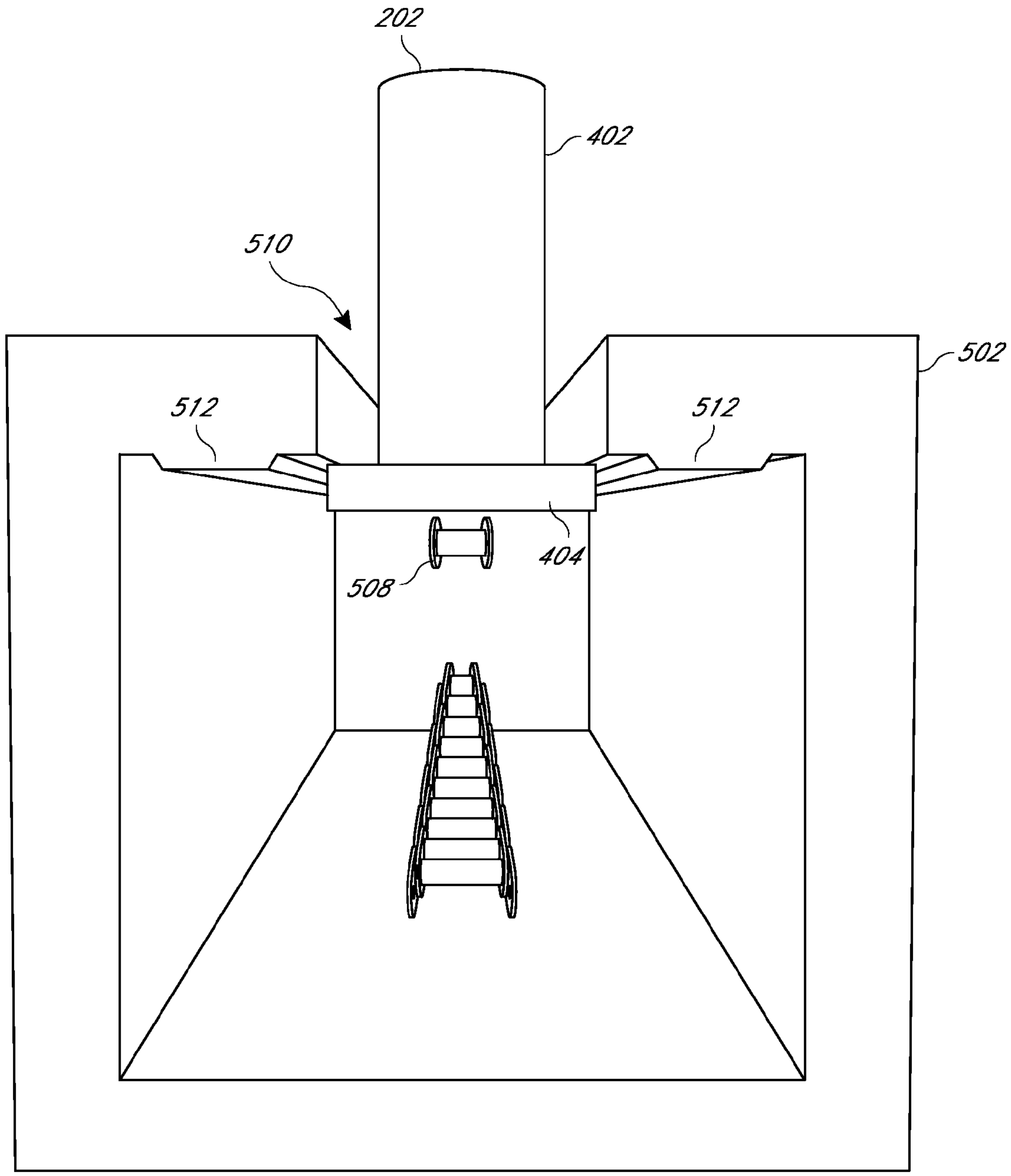
FIG. 5B is a schematic, cross-section view of the rail along the line shown in FIG. 5A, as well as a driver during initial engagement with the rail.
Figure 5C:
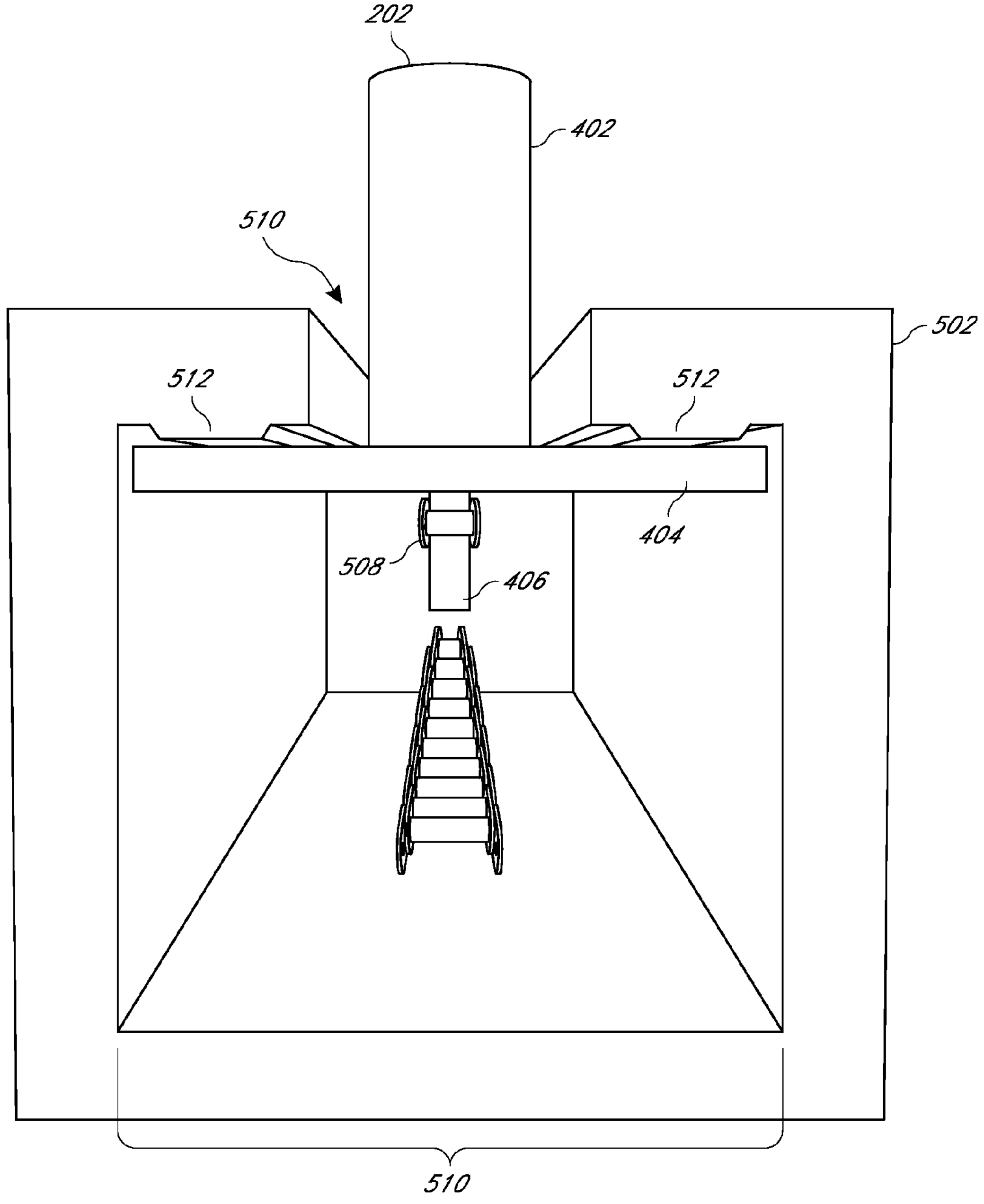
FIG. 5C is a schematic, cross-section view of the rail along the line shown in FIG. 5A, as well as a driver after engagement with the rail.

FIGS. 5A-C are illustrative diagrams of a portion of a rail 102 of the lattice 101. Specifically, FIG. 5A is an isometric projection of the rail 102, while FIGS. 5B and C are cross-section views of the rail 102 along the line 512 of FIG. 5A, during and after engagement of a driver 202 to the rail 102, respectively.

In the illustrative embodiment of FIGS. 5A-C, the rail 102 is a hollow square prism with a width and height both equal to w. In other embodiments, the rail 102 may be cylindrical, be a rectangular prism with unequal width and height, or be some other shape. The rail includes an engagement slot 510, which enables a driver 202 of a container 202 to access a propulsion device 508 housed within the rail 102. Illustratively, the propulsion device 508 is a chain drive, such as a roller chain. In other embodiments, the propulsion device 508 is a belt or other drive mechanism. As shown in FIGS. 5A-C, the propulsion device 508 is slotted to enable the engagement pin 406 of a driver to engage with the chain, thus pulling the driver 202 (and attached container 200), along the rail 102 to move containers 200 within the ASRS lattice 101. The propulsion device 508 is illustratively powered by a drive shaft 504, which is attached to a motor of the ASRS lattice 101 (not shown in FIGS. 5A-5C) under control of the control system 106. In some embodiments, gearings or other driving mechanisms may be used in place of a drive shaft 504. The rail 102 also includes one or more support members 506, which can be static (e.g., support rods) or dynamic members (e.g., gears) within the rail 102. These support members 506 can assist in maintaining the position of the propulsion device 508 as it moves inside the rail 102 (e.g., by preventing sagging of the propulsion device 508). While support member 506 is shown in FIG. 5A as protruding from the rail 102, in some instances, the support members 506 may be flush with the surface of the rail 102, or completely enclosed within the rail 102.

A driver 202 may engage with a rail 102 by extending the driver 202's extension arm 402 into the engagement slot of the rail 102, and rotating the driver 202, such that the engagement plate 404 of the driver 202 contacts an inner surface of the rail 102, as is shown in FIGS. 5B and C. Specifically, as shown in FIG. 5B, a driver 202 may be rotated such that its engagement plate 404 moves past the engagement slot 510 of the rail into the hollow portion of the rail 102. Thereafter, as shown in FIG. 5C, the driver 202 can be rotated to cause the engagement plate 404 to contact an inner surface of the rail 102, preventing the driver 202 from being removed from the rail 102. The engagement pin 406 of the driver 202 can then be extended to contact the propulsion device 508, thereby causing the driver 202 (and associated container 200) to move along the rail 102 as the propulsion device 508 is powered.

In some embodiments, the rail 102 may provide electrical power, a communication channel, or both to the container 200. Illustratively, the inner surface of the rail 102 on either side of the engagement slot 510 may include a conductive strip 512. While shown in FIGS. 5A and 5B as extending from the inner surface of the rail 102, in some instances the conductive strip 512 may be flush with an inner surface of the rail 102. In one embodiment, a first conductive strip 512 provides positive electrical power to the driver 202 (or one half of an alternating current circuit), while the second conductive strip 512 provides an electrical ground to the driver 202 (or a corresponding half of an alternative current circuit). The driver 202 may therefore include corresponding conductive pads that transmit the electrical power to the container 200. In another embodiment, each rail 102 may provide one half of an alternating current, which can be transmitted to the container 200 via the driver 202 (for a first rail 102), and via a stabilizer 206 in contact with an adjacent rail. In instances where the rails 102 provide electrical power to the container 200, the container 200 may utilize power-line communications protocols to transmit and receive information over the rail 102 to the control system 106. Thus, the control system 106 may utilize one or more drivers 202 on a container 200 to engage the container 200 to a rail within the ASRS lattice 101, and utilize the propulsion device 508 within the rail 102 to move containers throughout the lattice 101.

In some instances, portions of the driver 202 or the rail 102 may include friction reducing elements, such as wheels, ball bearings, or friction reducing coatings, to reduce friction when engaging the driver 202 with the rail 102. For example, the extension arm 402, the engagement plate 404, or both may include friction reducing surfaces. Additionally or alternatively, portions of the rail 102 (e.g., those portions potentially contacting the driver 202) may include friction reducing surfaces. For example, the conductive strips 512 may include rolling elements, such as ball bearings, that serve both to reduce friction with an engagement plate 404 and to provide power to the container 200.

Figure 6:
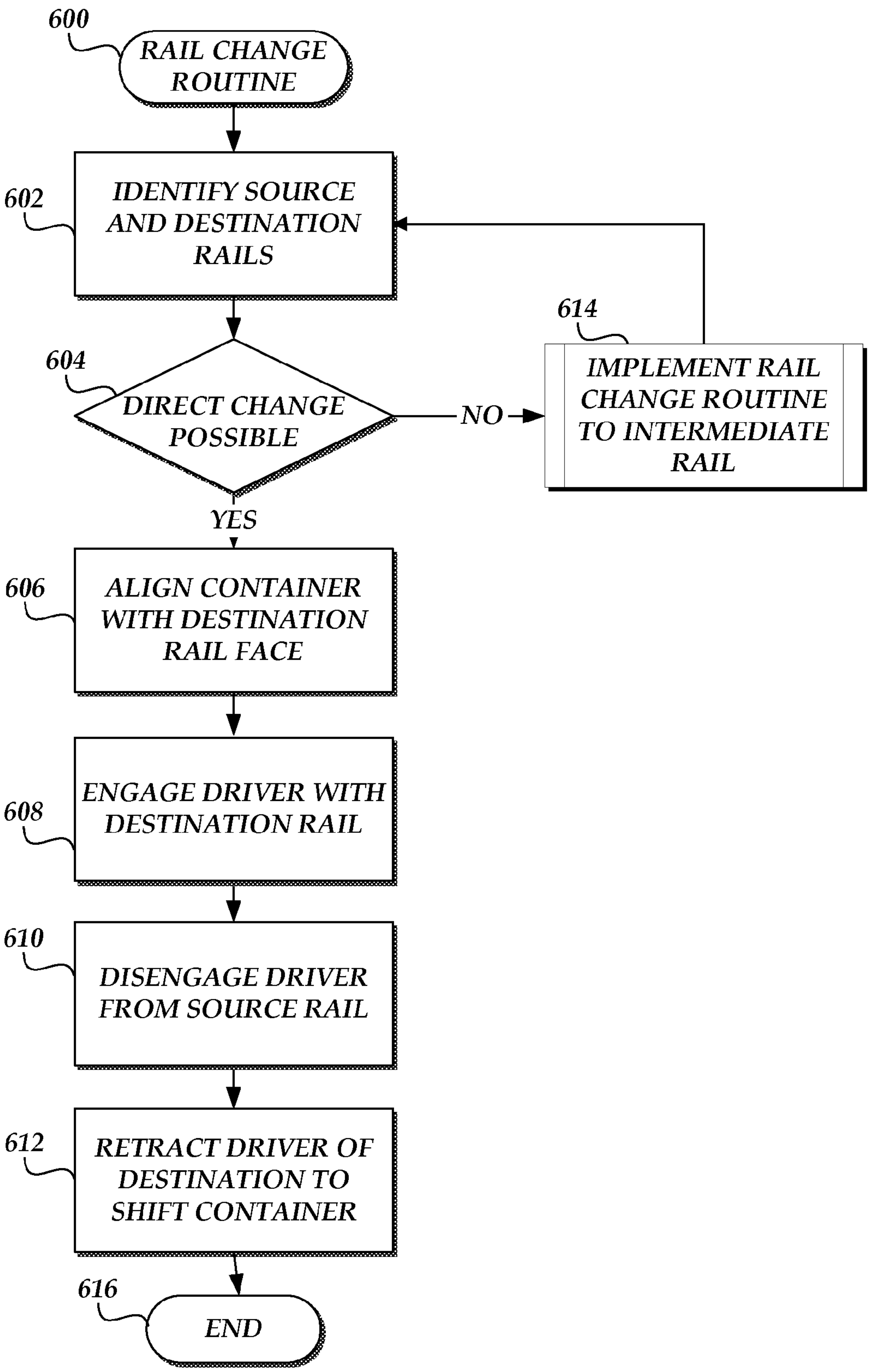
FIG. 6 is a flow chart depicting an illustrative routine for moving a container within the ASRS of FIG. 1 from a first rail of the ASRS to a second rail of the ASRS.

With reference to FIG. 6, one illustrative routine 600 will be described for moving a container 200 between various rails 102 of the lattice 101 depicted in FIG. 1. For example, the routine 600 may be utilized by the control system 106 to move a container 200 from a rail 102 allowing movement in a first dimension (e.g., the 'X' dimension) to a rail 102 allowing movement in a second dimension (e.g., the 'Y' dimension). For ease of reference, the routine 600 will be described with reference to FIG. 2A, under the assumption that the container 200 is initially engaged with rail 102A via rail face 104A (enabling movement in the X dimension). However, the routine 600 may be implemented with respect to any combination of rails 102 of different dimensions.

The routine 600 begins at block 602, where the control system 106 determines a source rail 102 with which the container 200 is presently engaged, as well as a destination rail 102 to which the container 200 should be moved. Illustratively, the source rail 102 may be determined by referencing data stored by the control system 106 (e.g., within memory or a data store) indicating a current rail 102 on which the container 200 is engaged. Alternatively, the source rail 102 may be determined by the control system 106 by issuing a query to the container 200 to determine which drivers 202 of the container are currently engaged with a rail 102. The destination rail 102 may be determined, for example, as part of a routine to move the container 200 within the lattice 101, as is described above. For example, the control system 106 may determine that a container 200 should be moved in the Y dimension in order to move the container towards a load/unload location within the lattice 101.

Thereafter, at block 604, the control system 106 determines whether a direct change between the source rail 102 and destination rail 102 is possible within the lattice 101. In one embodiment, the control system 106 may maintain a rule set specifying whether a direct change between any two rails 102 is possible. For example, with respect to the configuration of the lattice 101 shown in FIG. 1, it is possible to move a container 200 directly from rails 102 enabling movement in the Z dimension to rails 102 enabling movement in the X dimension, or to move a container 200 directly from rails 102 enabling movement in the X dimension to rails 102 enabling movement in the Z dimension, but not to move a container 200 directly between rails 102 enabling movement in the Z dimension and rails 102 enabling movement in the Y dimension (due to the physical configuration of the lattice 101). Of course, different physical configurations of the lattice may alter the specific rails 102 that a container 200 may move directly between. Illustratively, direct movement between two rails 102 may be possible so long as movement of the container 102 along a first rail 102 allows drivers of the container to align with an appropriate rail face 104 on a second rail 102 (e.g., a rail face 104 providing propulsion on the second rail 102).

In the instance that a direct change of rails 102 is possible, the routine 600 proceeds to block 606, where the control system 106 aligns the container with a rail face 104 of the destination rail 102. Illustratively, the control system 106 may engage a motor or other propulsion device of the source rail 102 (with which the container 200 would be presently engaged), to align one or more drivers 202 of the container with a rail face of the destination rail 102. For example, where the source rail 102 is rail 102A of FIG. 2A (enabling movement in the X dimension) and the destination rail 102 is rail 102K of FIG. 2A (enabling movement in the Z dimension), the control system 106 can provide power to the propulsion chain of rail 102A to move the container 200 in the positive direction within the X dimension, thereby causing the drivers 202C and 202D to align to face 104K.

Thereafter, at block 608, the control system 106 instructs the container 200 to engage the aligned drivers 202 with the face 104 of the destination rail 102. Continuing with the example provided above, the control system 106 may instruct the container 200 to extend drivers 202C and 202D, such that an engagement plate 404 of those drivers passes through an engagement slot 510 of the rail 102K, and to rotate the drivers 202C and 202D to lock the engagement plate 404 into the engagement slot 510, thereby beginning engagement of the container 200 with the rail 102K.

At block 610, the control system 106 instructs the container 200 to disengage from the source rail 102 (e.g., by instructing the container to rotate and retract drivers 202 currently engaged with the source rail 102). Continuing with the present example, the control system 106 may instruct the container 200 to rotate drivers 202E and 202F, such that an engagement plate 404 of those drivers aligns with an engagement slot 510 of the rail 102A, and to retract the drivers 202E and 202F to disengage the container 200 from the rail 102A.

At block 612, the control system 106 instructs the container 200 to retract the drivers 202 in the process of engaging with the destination rail 102, thereby completing engagement of the container 200 with the destination rail 102. In some instances, retraction of the drivers 202 may cause the container 200 to shift its location within a cavity of the lattice 101. For example, in the example above, a gap of width w may exist between an initial location of the container 200 and the rail face 104K. Thus, by retracting drivers 102C and 102D to engage the container with rail 102K may cause the container 200 to shift within the lattice 101 to close that gap, such that a face of the container 200 makes contact with rail face 104K. The container 200 may thereafter move along the destination rail 102K without contacting rails 102 corresponding to other dimensions (e.g., rail 102A). The routine 600 may thereafter end at block 616. Conversely, extending drivers 102C and 102D may cause the container 200 to shift within the lattice 101 away from the rail 102K, allowing subsequent reengagement with rail 102A.

Returning to block 604, if a direct change between a source rail 102 and destination rail 102 is not possible, the routine 600 continues to block 614, where an additional instance of the routine 600 is implemented in order to move the container 200 to an intermediate rail 102 that may allow a direct change to the destination rail 102. For example, where the control system 106 is attempting to move a container 200 from rail 102K enabling movement in the Z dimension to rail 102H enabling movement in the Y dimension, and such a change is not directly possible, the control system 106 may, at block 614, implement a second instance of the routine 600 to move the container 200 to rail 102A enabling movement in the X dimension. After execution of the second instance, the routine 600 may continue at block 602. Because direct movement of the container 200 from rail 102A to rail 102H is possible, the routine 600 may then continue at block 606, as described above. In some embodiments, the control system 106 may determine the intermediate rail 102 utilized by block 614 based on predetermined rules maintained by the control system 106. For example, in the lattice 101, the control system 106 may maintain a rule that movement from rails 102 enabling movement in the Z dimension to rails 102 enabling movement in the Y dimension should utilize an intermediate rail 102 enabling movement in the X direction. The specific rules utilized by the control system 106 may vary based on the physical construction of the lattice 101.

One skilled in the art will appreciate that the routine 600 may include fewer or more interactions than described above. For example, in addition to controlling drivers 202 during engagement or disengagement of a container 202 from a rail 102, the control system 106 may additionally instruct the container 200 to extend or retract stabilizers 206 as appropriate. For example, implementation of block 608 may include extending stabilizers 206 that stabilize motion in a intended direction along the destination rail 102, while implementation of block 610 may include retracting stabilizers 206 currently stabilizing motion along the source rail 102. Accordingly, the interactions of routine 600 are intended to be illustrative in nature, rather than exhaustive.

The terms "approximately," "about," "generally" and "substantially" as used herein represent an amount close to the stated amount that still performs a desired function or achieves a desired result. For example, the terms "approximately," "about," "generally," and "substantially" may refer to an amount that is within less than 10% of the stated amount. As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

All of the methods and processes described above may be embodied in, and fully automated via, software code modules executed by one or more computers or processors. Such computers or processors can include a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few. Moreover, code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although a multidimensional ASRS 100 has been disclosed in the context of certain embodiments and examples, it will be understood by those skilled in the art that the multidimensional ASRS 100 extends beyond the specifically disclosed embodiments to other alternative embodiments and/or uses of the embodiments and certain modifications and equivalents thereof. For example, some embodiments of the multidimensional ASRS 100 include bearings (such as rolling-element bearings) along one or more rails 102 to constrain motion of containers 200 to a desired dimension and to reduce friction along the rails 102. Accordingly, it is intended that the scope of the multidimensional ASRS 100 disclosed herein should not be limited by the particular disclosed embodiments described above, but should be determined only by a fair reading of the claims that follow.

What is claimed is:

1. An automated storage and retrieval system comprising:

a support lattice comprising:

a first series of rails comprising a plurality of rails spaced at regular intervals and aligned to a first dimension;

a second series of rails comprising a plurality of rails spaced at regular intervals and aligned to a second dimension perpendicular to the first dimension;

a third series of rails comprising a plurality of rails spaced at regular intervals and aligned to a third dimension perpendicular to the first and second dimensions;

wherein each rail of each series of rails includes a drive chain;

one or more motors to provide power to the drive chain of each rail;

a container proportioned to move between the rails of the support lattice, the container including a first driver to engage the container with the first series of rails, a second driver to engage the container with the second series of rails, and a third driver to engage the container with the third series of rails, wherein each of the first, second, and third drivers is configured to engage the container with the first, second, or third series of rails by extending an engagement portion of the respective drivers into the drive chain of at least one rail of the corresponding first second, or third series of rails; and a control system including a memory including specific computer-executable instructions and a processor configured with the specific computer-executable instructions to selectively engage the container with at least one of the first, second, or third series of rails and to move the container along the engaged series of rails by providing power to a drive chain of at least one rail from the engaged series of rails.

2. The system of claim 1, wherein:

each rail of the first series of rails contacts at least one rail of the second series of rails and at least one rail of the third series of rails;

each rail of the second series of rails contacts at least one rail of the first series of rails and at least one rail of the third series of rails; and each rail of the third series of rails contacts at least one rail of the first series of rails and at least one rail of the second series of rails.

3. The system of claim 1, wherein each rail of the first, second and third series of rails includes an engagement slot enabling at least one of the first, second, or third drivers of the container to engage the container with the rail.

4. The system of claim 3, wherein the first driver to engage the container with the first series of rails comprises:

an engagement plate dimensioned to pass through the engagement slot of a rail of the first series of rails while the engagement plate is in a first orientation; and an extension arm configured to extend the engagement plate from the container and pass the engagement plate through the engagement slot of the rail of the first series of rails; and wherein the engagement portion of the first driver comprises an engagement pin.

5. The system of claim 4, wherein each of the first, second, and third drivers is connected to the container via a linear actuator enabling the respective first, second, or third driver to be extended from and retracted into the container.

6. The system of claim 4, wherein the engagement plate rotates to a second orientation with respect to the engagement slot to engage the container with the rail of the first series of rails.

7. The system of claim 1, wherein the specific computer-executable instructions further cause the processor to maintain a current position value indicating a position of the container with respect to the first, second and third series of rails.

8. The system of claim 1, wherein the specific computer executable instructions further cause the processor to:

obtain a desired position for the container with respect to the first, second and third series of rails; and cause the container to move to the desired position with respect to the first, second and third series of rails.

9. The system of claim 1, wherein specific computer executable instructions further cause the processor to:

generate, within a data store, a contents listing for the container;

receive a request for an item specified within the contents listing; and in response to the request, cause the container to move to an unload position with respect to the first, second and third series of rails.

10. An system comprising:

a first series of rails comprising a plurality of rails aligned to a first dimension, each rail of the first series of rails including a propulsion device enabling movement along the rail of containers engaged with the propulsion device;

a second series of rails comprising a plurality of rails aligned to a second dimension perpendicular to the first dimension, each rail of the second series of rails including a propulsion device enabling movement along the rail of containers engaged with the propulsion device;

a third series of rails comprising a plurality of rails aligned to a third dimension perpendicular to the first and second dimensions, each rail of the third series of rails including a propulsion device enabling movement along the rail of containers engaged with the propulsion device; and a container proportioned to move along individual rails of the first, second and third series of rails, the container including first, second, and third drivers configured to engage the container with the respective first, second, and third series of rails, wherein each driver is configured to engage the container with the respective first, second, or third series of rails by extending an engagement portion of the driver into the propulsion device of a rail of the respective first second, or third series of rails.

11. The system of claim 10, wherein the first, second and third series of rails form a lattice structure.

12. The system of claim 10 further comprising a control system including a memory including specific computer-executable instructions and a processor configured with the specific computer-executable instructions to:

transmit instructions to the container to selectively engage with the first, second, or third series of rails; and cause the container to move along the engaged series of rails by causing power to be provided to a propulsion device of the engaged series of rails.

13. The system of claim 12, wherein the specific computer-executable instructions further cause the control system to maintain a current position value indicating a position of the container with respect to the first, second and third series of rails.

14. The system of claim 12, wherein the specific computer executable instructions further cause the control system to:

obtain a desired position for the container with respect to the first, second and third series of rails; and cause the container to move to the desired position with respect to the first, second and third series of rails.

15. The system of claim 12, wherein specific computer executable instructions further cause the control system to:

generate, within a data store, a contents listing for the container;

receive a request for an item specified within the contents listing; and in response to the request, cause the container to move to an unload position with respect to the first, second and third series of rails.

16. The system of claim 10, wherein the propulsion device is at least one of a drive chain or a drive belt.

* * * * *